Jan. 24, 1928.
H. W. DELZELL
REENFORCED SIDE DRIVING BELT
Filed Feb. 14, 1927
1,657,300
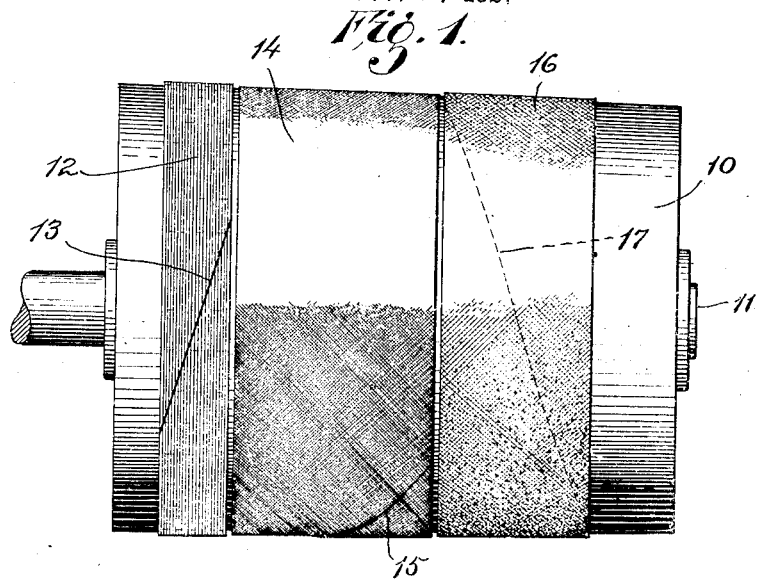
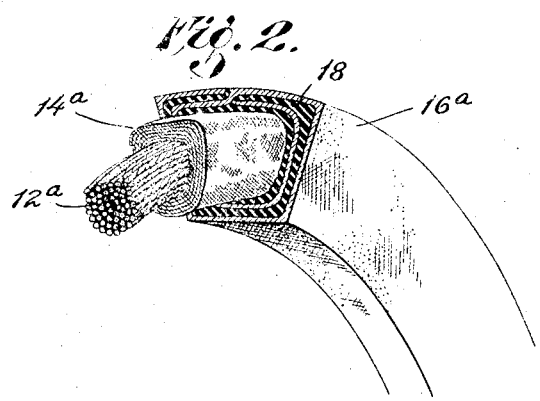
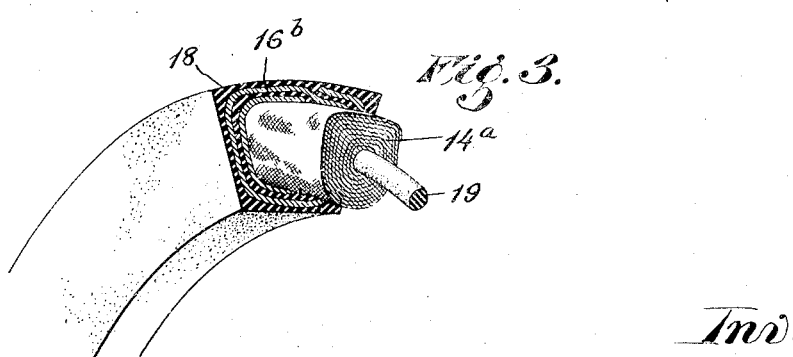
Inventor
Harold W. Delzell
By Pierson, Eakin & Avery.
Attys.

Patented Jan. 24, 1928.

1,657,300

UNITED STATES PATENT OFFICE.

HAROLD W. DELZELL, OF AKRON, OHIO, ASSIGNOR TO THE B. F. GOODRICH COMPANY, OF NEW YORK, N. Y., A CORPORATION OF NEW YORK.

REENFORCED SIDE-DRIVING BELT.

Application filed February 14, 1927. Serial No. 167,902.

This invention relates to rubber belts and belting of the side driving type, reenforced with fabric and/or cords or threads, and its objects are to secure increased durability in structures of this class, combined with adequate gripping effect on the pulleys, and to provide as close an approximation to a uniform structure at different points longitudinally of the belt as is consistent with economical manufacture.

In some aspects the invention may be regarded as an improvement upon the belt described in Gammeter Patent No. 1,610,942 of December 14, 1926.

Of the accompanying drawings, Fig. 1 is a side elevation showing a building drum and belt forming materials thereon illustrating one mode of laying up an endless belt in accordance with the present invention.

Fig. 2 is a perspective view, partly in section, showing a partially dissected portion of a finished belt embodying the invention.

Fig. 3 is a view similar to Fig. 2, showing a modification.

Referring at first to Fig. 1, 10 is a building drum freely rotatable on a stationary shaft 11 and having its periphery slightly tapered for the purpose of reducing the force necessary to roll the belt components upon each other when such rolling takes place from the larger toward the smaller diameter of the drum.

In this instance, the first component laid circumferentially upon the drum near the left hand end or largest diameter thereof is a core-forming band 12 of friction-coated or otherwise rubberized, straight-laid thread fabric, with its ends cut diagonally upon parallel lines and brought together as indicated at 13, preferably in a lap splice. I do not lay claim to this particular type of core-forming band or the belt core made therefrom, and may substitute other suitable forms of core.

The next component is an inner or intermediate body-forming filler band 14 of square-woven, bias-laid, rubberized fabric, with its ends joined in a diagonal splice 15, preferably lapped, said splice being stepped around from the core splice 13 so that the two will not substantially overlap in the finished belt. The fabric in this band is preferably relatively thin sheeting of comparatively fine mesh or weave, and I prefer to rubberize it with only a friction coat of soft rubber compound on each side.

The third component is a band 16 of square-woven, bias-laid fabric with its ends joined in a diagonal splice 17, preferably lapped, said splice being circumferentially stepped around from the other two for the purpose previously indicated. The fabric in this band may be a medium duck, somewhat thicker and of coarser mesh or weave than the fabric in the band 14. I prefer to rubberize this band 16 with friction coatings of rubber on both sides and a skim coating on one side, the skim-coated side in this instance being outermost or away from the surface of the drum 10, so that the friction coated surface will lie on the outside of the belt and furnish only a thin coating of rubber for the side wearing surfaces of the belt.

It will be understood that all three of these bands are preferably cut from more extensive sheets which have been coated with vulcanizable, soft-rubber compound in a calender. The distance between the adjoining edges of the bands upon the drum may be varied as desired from that shown.

The term "square-woven," as used in the specification and certain of the claims herein, defines ordinary woven fabric having strength-giving threads in both the warp and weft as distinguished from thread fabric of substantially all-warp texture having only occasional weak weft threads or none at all. It is not intended to limit any of the claims to fabric whose warp has exactly the same number of threads per inch as the weft. The fineness or coarseness of the respective fabrics, their relative unit weight, thickness or density are readily perceptible by sight and feeling and may be determined and varied by selecting the desired thread and weaving characteristics in ways well known to the textile art.

The belt-forming bands being thus laid upon the drum, the tackiness of their rubber coatings may be increased by wiping with gasoline, and the belt is then formed by first rolling the core band 12 upon itself in a plurality of convolutions from the left edge toward the right, then continuing the rolling to bring said core upon the body band 14 and to roll said body band upon itself in a plurality of convolutions, and further continuing the rolling to bring the rolled-up, core-containing body band upon the cover band 16 and to roll the latter upon itself in a plurality of convolutions, the width of the cover band being preferably such as to form about two plies in the belt.

The rolling is continued to carry the raw belt off of the drum 10, whereupon it is preferably subjected to a stretching operation prior to the vulcanization and is then vulcanized in the cross-sectional form which is desired in the completed belt. This may be a V form as indicated in Figs. 2 and 3, in which case the raw belt is placed in a suitable vulcanizing mold and subjected to the curing operation.

In Fig. 2, 12ª is the rolled-up core of straight-laid, rubberized threads which renders the belt substantially inextensible, 14ª is the rolled-up, tubular filler member or section of relatively thin, fine-mesh, bias, woven fabric in a plurality of convolutions, and 16ª is the rolled-up outer body section or cover member of relatively thick, coarse-mesh, bias, woven fabric with a skim coating 18 of rubber on the inner faces of the plies.

The modification shown in Fig. 3 differs from Fig. 2 in two respects, either or both of which may be used as a variation. First, instead of the inextensible thread core, I show a vulcanized, soft-rubber core 19 employed as a starting member on which to roll the first bias fabric band to form the member 14ª, said core rendering the belt solid at the center. Secondly, the outer or cover member 16ᵇ of relatively coarse and thick bias fabric in this case is laid with its frictioned side innermost, so that the skim coating 18 comes on the outer sides of the plies, giving a somewhat better grip to the side-driving surfaces, although a less durable surface until the rubber wears off down to the fabric.

Among the advantages obtained by using these body parts of different characteristics in the arrangement described or suitable variations thereof, are that the relatively thin fabric 14 with only a thin rubber coating tends to reduce the lateral compressibility of the belt and limit its wedging grip in the pulleys, thereby minimizing the wear upon the driving surfaces of the belt. The doubled thickness of the diagonal lap-splice in the member having these characteristics makes a relatively shallow ridge around the raw belt as compared with a thicker and more heavily rubberized fabric and contributes to greater uniformity of structure at different points longitudinally of the vulcanized belt. The coarser and more heavily rubberized fabric in the band 16, particularly when used for the outermost member of the belt, provides a somewhat more durable wearing surface which is readily flexed in turning around the pulleys, it furnishes a desirable degree of cushioning action to resist the strains of operation at and near the belt surfaces, and it contains sufficient rubber binder to secure the maximum adhesion between the plies and, in large part, to absorb the external ridge which might otherwise be formed by the lapped diagonal splice.

It will be understood that other variations than those indicated can be made within the scope of the invention as defined in the claims.

I claim:

1. A vulcanized, side-driving belt structure comprising adherent, concentric sections of bias-laid, rubberized fabric of respectively thin, fine-thread and thicker, coarse-thread textures, the former being laid in a greater number of plies per unit of belt thickness than the latter.

2. A vulcanized, side-driving belt structure comprising adherent, concentric sections of bias-laid, rubberized fabric of respectively light and heavy textures, the former being more thinly rubberized and being laid in a greater number of plies per unit of belt thickness than the latter.

3. An endless, vulcanized, side-driving belt comprising an inner section of bias-laid, rubberized, square-woven fabric of relatively fine texture, transversely rolled upon itself, and a surrounding outer section of bias-laid, rubberized, square-woven fabric of relatively coarse texture, transversely rolled upon itself.

4. A belt according to claim 3, in which the inner and outer sections are diagonal spliced bands and the fabric of the outer section is more heavily rubberized than that of the inner section.

5. A vulcanized, side-driving belt structure comprising a reenforcing cord core, and concentric, surrounding, tubular sections of bias-laid, rubberized, square-woven fabric, one of said sections being of finer-thread texture and less heavily rubberized than another.

6. A vulcanized, side-driving belt comprising a core, a tubular filler section thereon consisting of a plurality of convolutions of bias-laid, rubberized, relatively thin, fine-mesh, square-woven fabric, and a tubular cover section consisting of bias-laid, rubberized, relatively thick, coarse-mesh, square-woven fabric.

7. An endless, vulcanized, side-driving belt comprising a central, reenforcing cord core, a surrounding filler section consisting of a plurality of convolutions of a bias-laid, rubberized, relatively thin, fine-mesh, square-woven, diagonally-spliced fabric band transversely rolled upon itself, and a cover section surrounding said filler section and consisting of a bias-laid, rubberized, relatively-thick, coarse-mesh, square-woven, diagonally spliced fabric band transversely rolled upon itself and more heavily rubberized than the fabric band of the filler section.

In witness whereof I have hereunto set my hand this 1st day of February, 1927.

HAROLD W. DELZELL.